United States Patent [19]

Davies

[11] Patent Number: 4,551,364
[45] Date of Patent: Nov. 5, 1985

[54] CORNER MEMBER FOR A SPACER STRIP FOR A SEALED WINDOW UNIT

[75] Inventor: Lawrence W. Davies, Winnipeg, Canada

[73] Assignee: Omniglass Ltd., Winnipeg, Canada

[21] Appl. No.: 630,275

[22] Filed: Jul. 12, 1984

[30] Foreign Application Priority Data

Jul. 15, 1983 [GB] United Kingdom ............... 8319264

[51] Int. Cl.[4] ........................... E06B 3/24; E04B 1/66
[52] U.S. Cl. ....................................... 428/34; 428/33; 428/122; 52/172; 52/476
[58] Field of Search ................... 428/35, 33, 34, 122; 52/172, 656, 476

[56] References Cited

U.S. PATENT DOCUMENTS

| | | | |
|---|---|---|---|
| 4,074,480 | 2/1978 | Burton | 428/34 |
| 4,368,226 | 1/1983 | Mucaria | 428/34 |
| 4,419,400 | 12/1983 | Hindersinn | 428/294 |
| 4,432,174 | 2/1984 | Grether et al. | 428/34 |
| 4,479,988 | 10/1984 | Dawson | 428/34 |

Primary Examiner—John E. Kittle
Assistant Examiner—James J. Seidleck
Attorney, Agent, or Firm—Stanley G. Ade; Adrian Battison

[57] ABSTRACT

A corner member for locating at right angles spacer strips of a sealed window unit includes a pair of legs at right angles each for extending into an adjacent end of one of the strips. The strips are of the type formed from fiberglass reinforced resin pultrusion defining a slot along the inner surface. To prevent the slot opening when the leg is inserted into the hollow interior of the strip, the leg includes a pair of laterally extending projections for engaging the strip in compression fit only at the junctions between the sides and outer edge of the strip.

13 Claims, 3 Drawing Figures

U.S. Patent  Nov. 5, 1985  4,551,364
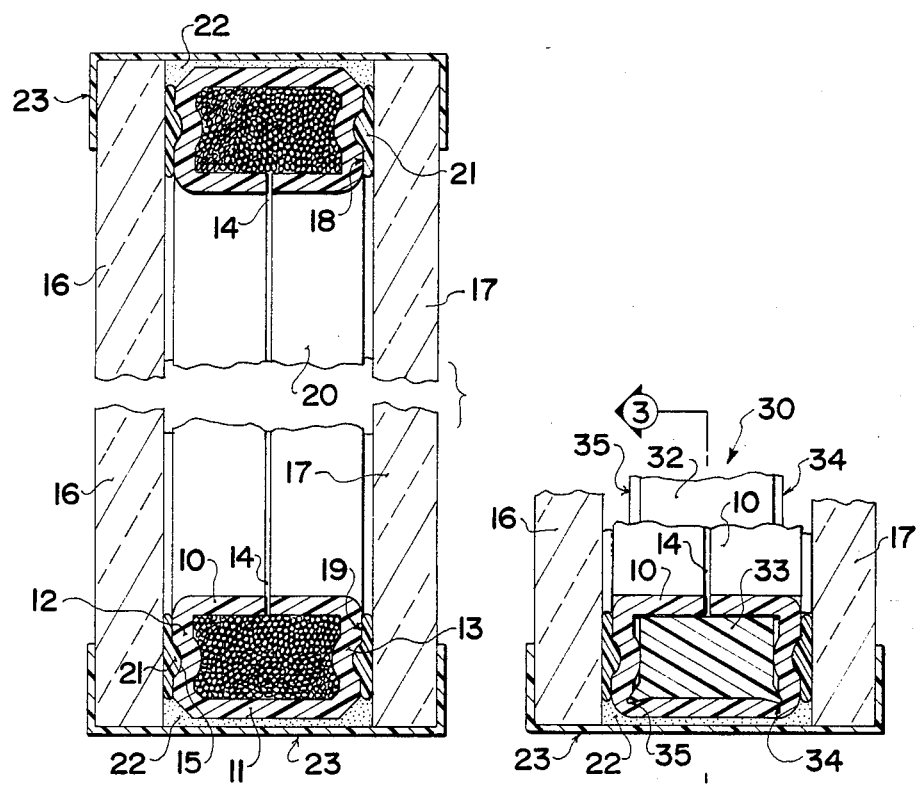
FIG. 1
FIG. 2
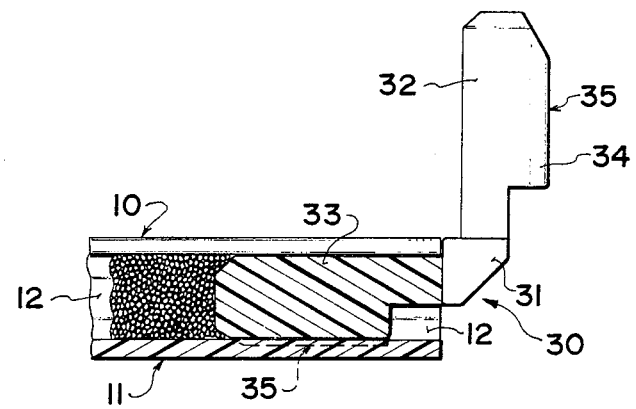
FIG. 3

CORNER MEMBER FOR A SPACER STRIP FOR A SEALED WINDOW UNIT

BACKGROUND OF THE INVENTION

This invention relates to a corner member for a spacer strip for the glass panes in a sealed window unit, and particularly for use with the spacer strip as disclosed and claimed in co-pending application Ser. Nos. 512,469, U.S., and No. 437,622 (Canada).

Sealed window units of this type have been known for many years and have become increasingly important and popular as energy conservation and energy efficiency have become more popular. Such a sealed window unit comprises an outer frame or tape supporting the glass panes and a spacer between the glass panes. The spacer is formed in strips which lie along adjacent edges of the panes so as to define a space therebetween and to support the panes in the defined spacing.

To date the most common material which has been commercially used for the spacer in the manufacture of such units has been steel. Steel has been used mainly because it has a co-efficient of expansion similar to that of glass and because this property is the most important in the manufacture of such a unit. It will of course be appreciated that any difference in expansion particularly in climates which have large changes in temperature can have many disastrous consequences, particularly as size of the window increases, including cracking of the glass and at least breaking of the seal between the panes of glass. Other metals such as aluminum are completely unsatisfactory on medium to large windows in that the thermal expansion is very different from that of glass. Similarly many plastics materials such as nylon, vinyl, polythene are available but again these are completely unsatisfactory in view of very different expansion characteristics. To date therefore steel has been the generally accepted material even though this has a number of considerable disadvantages. In particular, the thermal conductivity of steel is considerably higher than that of glass or of the air space between two panes of glass. In a sealed unit heat from within a building tries to escape from a building and the path it takes is through the path of least resistance. In the case of a sealed window unit, the path of least resistance is around the perimeter of the unit where the steel spacer strip is provided. Thus heat is rapidly lost from around the perimeter of the window often causing a ten degrees to twenty degrees farenheit temperature drop at the perimeter of the window relative to the center thereof.

This temperature differential results in differential shrinkage between the center of the glass pane and the perimeter. This can result in a stress crack developing in the glass or can result in the loss of the sealing around the edges of the panes. When the seal breaks down outside air can enter the space between the windows carrying water vapour which is deposited inside the panes causing fogging of the window unit. Approximately five percent of the window units manufactured tend to fail due to such stress cracks, or loss of seal. However it is often thought that the failure is due to shifting of the building rather than to a failure of the window unit itself.

A yet further problem with steel spacer strips is that they are manufactured in certain cut lengths which necessarily cause wastage when cut to specific lengths for use in the window unit. Obviously it is necessary to cut the steel into particular lengths for shipping and handling and of course these lengths cannot be predetermined relative to particular requirements. In addition the finite lengths of the steel strips makes automation of the handling and cutting processes more difficult.

Steel and aluminum spacers of this kind are manufactured by rolling or folding to form a hollow body which is substantially rectangular in cross-section with a slot or interlock along the upper surface between the two folded edges of the steel strip from which the folded body is formed. It is important to maintain the width of the slot as narrow as possible in order to allow the ingress of air from the space between the window panes while preventing the escape of granular dessicant material. In manufacture of a window unit using the spacer, dessicant is added into the interior of the hollow spacer so as to dry out the air remaining between the panes of glass so that no water is condensed onto the inside faces of the glass thus fogging the window unit. Steel which is very unsuitable for extrusion processes can however be readily formed by a folding process into a shape of this type. However folding processes are limited in the type of shape that can be formed.

In the above applications there is disclosed a spacer strip formed from a pultruded glass fibre reinforced material which provides a number of improvements relative to the prior art steel arrangement.

However, one particular problem arises in the use of a pultruded glass fibre reinforced material in that the material is less rigid than the conventional steel strip and therefore the conventional design of corner member whereby four of the strips are interconnected at right angles to form a rectangular spacer for the outside of the sealed window unit causes problems. Specifically the conventional corner member acts to open the slot in the pultruded glass fibre reinforced spacer strip so as to deform the strip with the danger of the dessicant escaping and also losing the accurate linearity which is required to seal against the glass panes.

It is one object of the present invention, therefore, to provide a corner member for use with a spacer strip of this type.

According to the invention, therefore, there is provided a corner member for joining spacer strips of a sealed window unit, the spacer strips each comprising a hollow elongate body of substantially rectangular cross-section providing two side surfaces for contacting and spacing adjacent surfaces of glass panes, an outer surface for facing outwardly of the outer edge of the glass panes and an inner surface for facing inwardly toward opposed spacer strips of the sealed window unit, the inner surface having a slot extending along the full length thereof, the corner member comprising a pair of legs arranged right angles, each of the legs being dimensioned so as to be received within the hollow body of one of the spacer strips in a compression fit, the leg being shaped and arranged such that the compression fit is limited to areas of the spacer strip adjacent junctions thereof between the sides and the outer surface whereby the compression does not cause opening of the spacer strip at the slot in the inner surface.

Preferably the compression fit at the confined areas is provided by a pair of lateral projections on the sides of the leg. These lateral projections can be defined by side surfaces converging to a sharp edge longitudinal of the leg and inclined outwardly and downwardly.

The invention also includes a combination of the corner member with spacer strips preferably of the above type wherein the junctions between the sides and outer surface of the spacer strip include co-operating recesses for receiving lateral projections of the legs of the corner member.

In this way all of the compression force or substantially the whole of the compression force is taken up in the outer surface without applying substantial bending moments to the sides about the junction and thus avoiding opening of the part at the slot in the inner surface.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a cross-sectional view taken from the above co-pending application showing a sealed window unit of the type employing a spacer formed from a pultruded glass fibre reinforced resin material.

FIG. 2 is a view similar to that of FIG. 1 showing a modified spacer strip and including a corner member according to the invention for connecting the spacer strip to an adjacent spacer strip at right angles thereto.

FIG. 3 is a part cross-sectional view along the lines 3—3 of FIG. 11 with one of the spacer strips omitted for clarity.

In the drawings like characters of reference indicate corresponding parts in the different figures.

The pultruded spacer is shown in cross-section and in situ in a sealed window unit in FIG. 1. It comprises an elongate hollow substantially closed body formed of a glass fibre reinforced pultruded material by method as will be described in more detail hereafter. The body comprises substantially straight upper and lower walls 10 and 11 and side walls 12 and 13. The upper wall 10 includes a slot centrally thereof running along the full length of the body, the slot indicated at 14. Each of the side walls 12, 13 includes a recess or groove 15 running along the full length thereof adjacent to the mid-point thereof.

The body is dimensioned such that the walls 12, 13 are spaced by the desired spacing between two panes of glass which in practice is of the order of 0.5 inches (1.25 centimeters). The height of the walls 12, 13 can be chosen in accordance with requirements but generally is of the order of 0.3 inches (0.8 centimeters) which is sufficient to provide adequate strength and also adequate adhesion to the glass.

The spacer is shown in FIG. 1 in a sealed window unit in which the two panes of glass are indicated at 16, 17 respectively and it will be appreciated that a length of the spacer is arranged at each of the four adjacent sides of the panes of glass with two such spacers at the top and bottom indicated at 18, 19 with the third spacer along the rear side as shown in the drawing indicated at 20. The spacer along the front side is not shown in the cross-section.

In manufacture of the sealed window unit with the glass cut to size, the spacers are cut to size and may be mitered or may be square cut with a corner insert as described in detail hereinafter so that they can lie along each of the adjacent sides of the panes of glass recessed slightly inwardly from the edge of the glass. Each of the spacers along the side walls 11, 12, 13 is suitably primed or etched by chemical or mechanical means so as to improve adhesion between the spacer and a sealing or filling agent indicated at 21 and the glass. The sealing agent 21 for example of a butyl material is inserted into the recesses 15 along the side walls 12, 13 so as to ensure that the spacer is sealed to the inside surfaces of the glass panes.

After assembly of the two panes of glass and the spacers with the sealing agent along the edges, the recess defined between the outside surface of the wall 11 of the spacer and the edge of the panes of glass is filled with a further quantity of a sealing agent for example a polysulphide material indicated at 22. Finally a tape 23 is applied to all the edges of the sealed window unit so as to extend slightly around the outer face of the glass panes for handling and to assist in securing the glass panes together and to yet further ensure a seal around the glass panes.

Prior to assembly of the sealed window unit a granular dessicant material is inserted into one or more of the spacer strips. Such granular dessicants are well-known in the trade and act to extract all the moisture from the air trapped between the glass panes so as to prevent any condensation within the glass panes. The slot 14 of the spacer strip as used in the sealed window unit is designed to have a width less than 0.025 inches (0.6 mm) and preferably of the order of 0.006 inches (0.15 mm). Such a width is sufficiently narrow to retain the granular dessicant, with the choice of the actual width and the type of dessicant within the normal skill of one in the art. In practice all four spacer strips are filled loosely with the dessicant to ensure that sufficient is provided to extract all the moisture from the space between the panes.

Turning now to the details of the corner member and spacer strip of the invention as shown in FIGS. 2 and 3 there is shown a modified spacer strip in conjunction with a corner member of a particular construction which provides a firm connection with the spacer strip while avoiding any tendency to open the spacer strip thus causing deformation. The corner member is indicated generally at 30 and comprises a central boss portion 31 with a pair of legs 32, 33 extending at right angles from the boss portion 31. The legs are of a cross-section shown in FIG. 2 comprising a substantially rectangular cross-section with sides, an inner surface and an outer surface, and a pair of lateral projections 34, 35 at or adjacent the outer surface thereof. Thus the projections 34, 35 project outwardly from the side walls at a position remote from the inner surface adjacent the slot 14.

The spacer strip is shown in cross-section in FIG. 2 and it will be noted particularly from FIG. 2 that the lateral projections 34, 35 are remote from the upper wall 10 of the spacer strip and hence remote from the slot 14. The lateral projections extend continously substantially wholly along the length of the leg and are shaped so as to conform to the inner surface of the spacer strip adjacent the junction between the lower wall 11 and the side walls 12, 13 and so as to form a compression fit between the lateral projections and the junction of the walls. Thus the lateral projections include side surfaces converging to a sharp edge along the length of the leg so as to incline outwardly and downwardly from the sides of the leg at the outer surface. The sides and upper surface of the leg are arranged as a sliding fit within the spacer strip so as to avoid applying forces to the walls of the spacer strip apart from the compression forces provided by the lateral projections. In this way, any opening of the strip is avoided and substantially all forces applied to the strip by the leg are taken up within the outer wall 11, which relative to the flexing about the slot 14, is substantially inelastic.

It will be noted from FIG. 2 that the spacer strip is modified relative to the spacer strip shown in FIG. 1 by the provision of a sharp or V-shaped corner at the junction between the walls 12, 13 and the wall 11. The radius of the apex can be in the range 0.01 inch to 0.015 inch. This sharp junction assists in applying the compression forces to the wall 11 and reducing the flexing of the walls 12, 13 but it will be apparent that other shapes in this area could be employed provided the forces are limited substantialy to the wall 11 and avoid substantial flexing of the walls 12, 1. As shown the apex of the V-shape turns slightly downwardly from the bottom wall of the spacer. It is possible for the apex however to be slightly above the bottom wall with a curved surface joining the apex to the bottm wall.

As shown in FIG. 3, the spacer strip is pushed onto the leg until is engages the boss portion 31. To assist in inserting the leg into the hollow spacer strip, the lateral projections 34, 35 can be tapered by, for example, 0.005 inch each side. The dimensions of the boss portion are such that it just receives the outside surface of the spacer strip so that a second spacer strip pushed onto the other leg 32 just touches the inner or upper wall 10 of the first spacer strip.

The boss portion does not extend outwardly to the outer surface or wall so as to provide a substantial area around the corner for receiving sealant which can enter into the spacer strip at the back of the corner member thus when set, fixing the corner member in place relative to the spacer strip and firmly locating the panes of glass relative to the spacer strip and the corner member.

The corner member can be formed of any suitable material which can be slightly compressed, for example, nylon or vinyl so as to provide the necessary compression fit between the lateral projections thereof and the inner surface of the spacer strip.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combination of a corner member and spacer strips for use in the manufacture of a sealed window unit comprising a plurality of spacer strips each comprising a hollow elongate body of substantially rectangular cross-section providing two side surfaces for contacting and spacing adjacent surfaces of glass panes, an outer surface for facing outwardly of the outer edge of the glass panes and an inner surface for facing inwardly toward opposed spacer strips of the sealed window unit, the inner surface having a slot extending along the full length thereof, the corner member comprising a pair of legs arranged right angles, each of the legs being dimensioned so as to be received within the hollow body of one of the spacer strips in a compression fit, the leg and spacer strip being shaped and arranged such that the compression fit is limited to areas of the spacer strip adjacent junctions thereof between the side surfaces and the outer surface whereby the compression fit does not cause opening of the spacer strip at the slot in the inner surface.

2. The combination according to claim 1 wherein each leg includes a pair of lateral projections each for engaging respective one of the areas adjacent said junctions.

3. The combination according to claim 2 wherein the lateral projections are arranged to extend continuously substantially along the full length of the leg.

4. The combination according to claim 2 wherein the lateral projections include side walls converging to a sharpened edge which extends longitudinally of the leg.

5. The combination according to claim 2 wherein the lateral projections are inclined outwardly and downwardly.

6. The combination according to claim 1 wherein the cross-section of the leg is such that it substantially fills the cross-section of the respective strip so as to contact the sides and inner surface in sliding fit.

7. The combination according to claim 2 wherein each strip includes a recess at each junction between a side and the outer surface of co-operating shape to respective one of said lateral projections.

8. The combination according to claim 6 wherein each strip includes a recess at each junction between a side and the outer surface of co-operating shape to respective one of said lateral projections.

9. A combination of a corner member and spacer strips for use in the manufacture of a sealed window unit comprising a plurality of spacer strips each comprising a hollow elongate body of substantially rectangular cross section providing two side surfaces for contacting and spacing adjacent surfaces of glass panes, an outer surface for facing outwardly of the outer edge of the glass panes, a pair of longitudinal junctions each between a respective side surface and the outer surface, and an inner surface for facing inwardly toward opposed spacer strips of the sealed window unit, the inner surface having a slot extending along the full length thereof, the corner member comprising a pair of legs arranged at right angles, each of the legs being dimensioned so as to be received within the hollow body of one of the spacer strips in a compression fit, the leg being shaped and arranged to include in cross section a pair of laterally extending projections, each converging to an edge longitudinal of the leg and spaced outwardly therefrom at a corner thereof so that the edges engage said junctions in compression fit whereby the leg does not cause opening of the spacer strip at the slot in the inner surface.

10. The combination according to claim 9 wherein said junctions of said spacer strips include a recess corresponding in shape to said projection.

11. The combination according to claim 10 wherein the projection and junction are generally V-shaped.

12. The combination according to claim 9 wherein said spacer strip is formed by pultrusion from a glass fibre reinforced material.

13. The combination according to claim 1 wherein said spacer strip is formed by pultrusion from a glass fibre reinforced material.

* * * * *